United States Patent
Neumann et al.

(10) Patent No.: US 9,796,317 B2
(45) Date of Patent: Oct. 24, 2017

(54) CUP HOLDER RETENTION FEATURE

(71) Applicant: FORD GLOBAL TECHNOLOGIES, LLC, Dearborn, MI (US)

(72) Inventors: Michael Neumann, Gisborne (AU); Vikas Saigal, Melbourne (AU); Christopher Emery Fesenmyer, Flat Rock, MI (US); Scott Simon, Dexter, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 48 days.

(21) Appl. No.: 14/730,494

(22) Filed: Jun. 4, 2015

(65) Prior Publication Data

US 2016/0355116 A1      Dec. 8, 2016

(51) Int. Cl.
*B60N 3/10*      (2006.01)
*E05D 15/06*      (2006.01)

(52) U.S. Cl.
CPC ............. *B60N 3/108* (2013.01); *B60N 3/10* (2013.01); *B60N 3/102* (2013.01); *E05D 15/0604* (2013.01)

(58) Field of Classification Search
CPC ............................... B60N 3/108; B60N 3/102
USPC ............. 296/24.34; 248/311.12; 297/188.15, 297/188.14, 188.16
See application file for complete search history.

(56) References Cited

U.S. PATENT DOCUMENTS

| | | | |
|---|---|---|---|
| 5,289,962 A | 3/1994 | Tull et al. | |
| 6,050,468 A * | 4/2000 | Kelley | B60N 3/103 224/542 |
| 6,409,136 B1 * | 6/2002 | Weiss | B60N 3/102 224/926 |
| 7,147,192 B2 | 12/2006 | Kong | |
| 7,789,265 B2 | 9/2010 | Kearney et al. | |
| 8,573,552 B2 * | 11/2013 | Andersson | B60N 2/4613 224/926 |
| 8,757,571 B2 * | 6/2014 | Shimajiri | B60N 3/106 224/282 |
| 9,272,651 B1 * | 3/2016 | Maya | B60N 3/102 |

(Continued)

FOREIGN PATENT DOCUMENTS

| | | |
|---|---|---|
| DE | 10112649 A1 | 10/2002 |
| DE | 102014013387 A1 * | 3/2016 |

(Continued)

OTHER PUBLICATIONS

Machine Translation of JP2012056415, printed from the EPO website, Sep. 15, 2016 (corresponds to WO2012032723A1).*
English machine translation for DE10112649.

*Primary Examiner* — Jason S Morrow
(74) *Attorney, Agent, or Firm* — Vichit Chea; King & Schickli PLLC (57) ABSTRACT

A cup holder assembly includes a door configured for translation between an open and a closed configuration, at least one receiver sidewall, and at least one first cup holder surface provided by a bottom surface of the door and configured to upwardly extend at least a portion of the receiver sidewall when the door is disposed in an open configuration. A retention system for a container is provided, including at least one container biasing member and at least one container supporting member. The container biasing member may be door-mounted or receiver sidewall-mounted.

10 Claims, 8 Drawing Sheets

(56) References Cited

U.S. PATENT DOCUMENTS

| | | | |
|---|---|---|---|
| 9,428,093 B2* | 8/2016 | Kupina | B60N 3/108 |
| 2012/0153113 A1* | 6/2012 | Voigt | B60N 3/101 |
| | | | 248/316.7 |
| 2013/0112831 A1* | 5/2013 | Kong | B60N 2/4686 |
| | | | 248/311.2 |
| 2014/0355252 A1 | 12/2014 | Antilla et al. | |
| 2015/0048099 A1* | 2/2015 | Soderberg | B60N 3/107 |
| | | | 220/738 |
| 2015/0053834 A1 | 2/2015 | Virgen | |

FOREIGN PATENT DOCUMENTS

| | | | |
|---|---|---|---|
| WO | WO-2012032723 A1 * | 3/2012 | |
| WO | 2014058544 A1 | 4/2014 | |
| WO | 2014179444 A1 | 11/2014 | |

* cited by examiner

CUP HOLDER RETENTION FEATURE

TECHNICAL FIELD

This disclosure relates generally to vehicle cup holders. More particularly, the disclosure relates to a cup holder assembly including a container biasing member and a container support member for preventing undesired motion of a container held in the cup holder.

BACKGROUND

Cup holders provide great convenience to motor vehicle users, providing a receiver for containers such as cups, glasses, etc. whereby the user need not continually hold the container in her hand to avoid spillage during motor vehicle operation. The typical cup holder provides at least a receiver configured to receive and hold a container such as a beverage container. That receiver may include a structure for reducing or preventing slippage or vibration of a container held therein, being as simple as one or more rubber pads or more complex designs. For example, it is known in the art to use biasable mechanical fingers to reduce or prevent container slippage or vibration. Typically 3-4 fingers are used to ensure a snug fit.

Figure 1A:
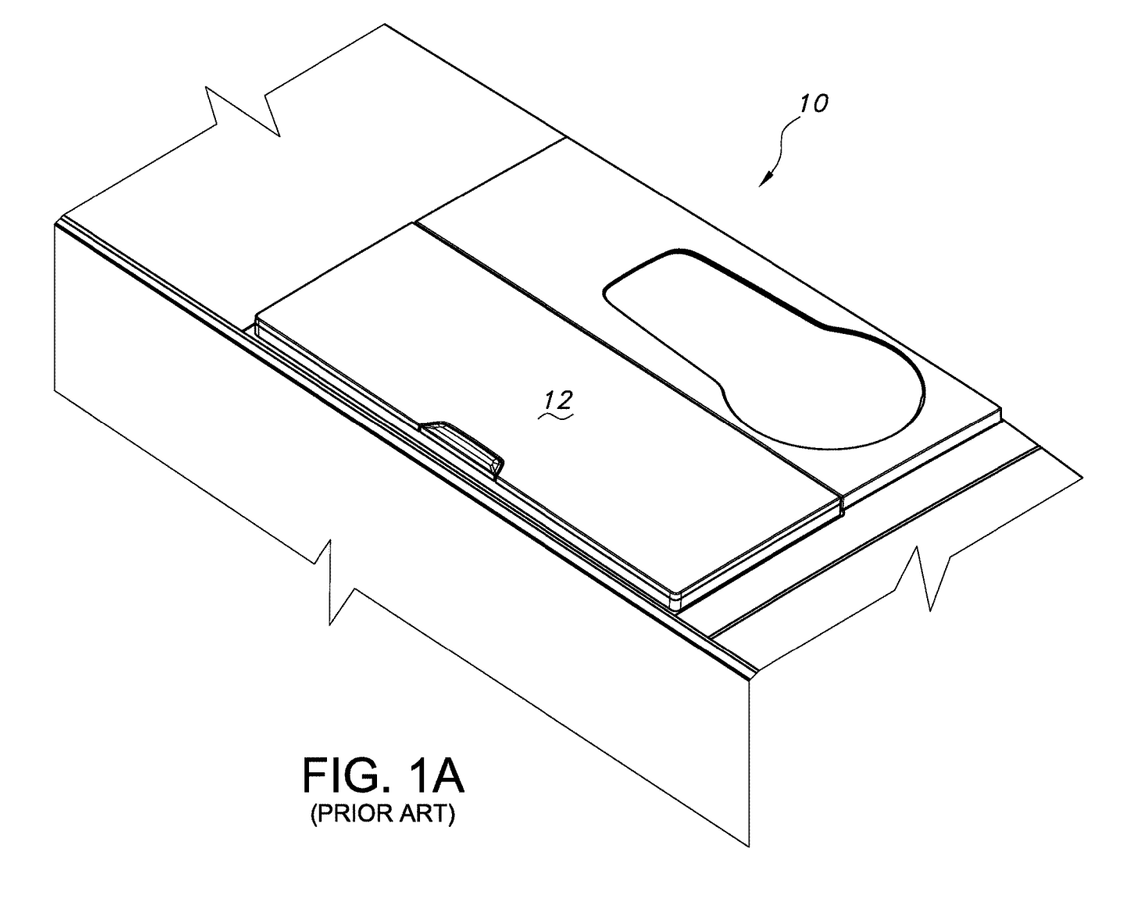
FIG. 1A depicts a prior art cup holder assembly including a door disposed in a closed configuration.
Figure 1B:
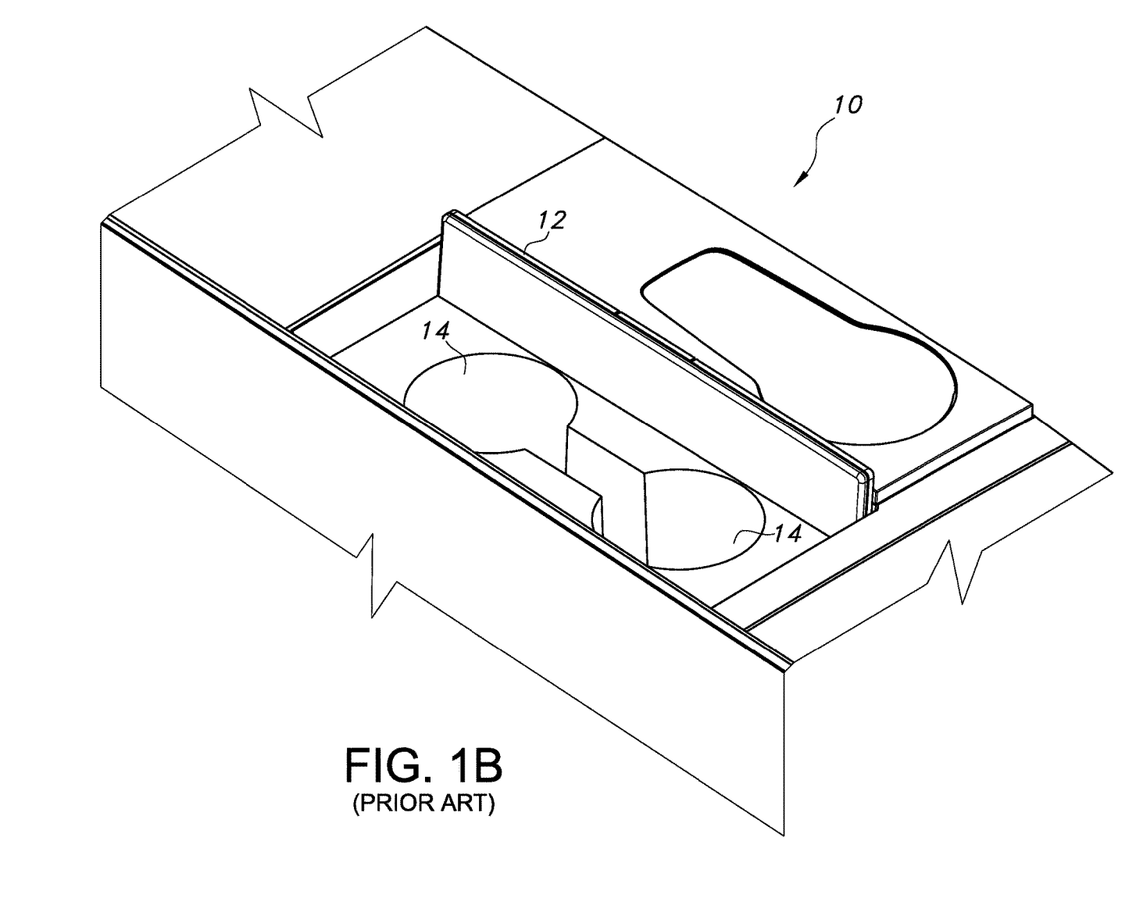
FIG. 1B depicts the cup holder assembly of FIG. 1A with the door in the open configuration.

It is known also to provide cup holders in a variety of designs and configurations, including cup holder structures 10 having doors 12 which can be translated between an open and a closed configuration (see FIGS. 1A and 1B), to reveal or hide one or more beverage container receivers 14. When closed, such doors 12 provide a smooth façade often blending in with the trim of the portion of the vehicle wherein the cup holder structure 10 is disposed. Modern motor vehicles may include cup holders in a variety of locations, including the dash panel, doors, center consoles, and others.

Conventional cup holder structures require space within the vehicle console, etc., in order to provide space and/or clearance for structures such as translatable doors and multiple mechanical fingers for reducing vibration/rattle that are capable of holding containers of differing dimensions. Cup holders including doors or covers often require additional clearance and/or space within the vehicle to accommodate the mechanism for actuating the door and the mechanical fingers. However, space is at a premium in the modern motor vehicle due to the assortment of other optional and/or required devices intended to provide safety, informational, and convenience factors to the user. It may be undesirable or impractical to allot otherwise usable space to a cup holder structure.

To solve this and other problems, the present disclosure relates to a cup holder assembly for installation in a vehicle. The cup holder assembly includes a cover or door that is configured to be translated between an open and a closed configuration. Advantageously, the disclosed cup holder assembly provides a receiver including retaining members for accommodating containers of a variety of dimensions, while presenting a relatively low profile and occupying less space in the vehicle console, door, etc. than conventional covered cup holder designs.

SUMMARY

In accordance with the purposes and benefits described herein, in one aspect a cup holder assembly includes a door configured for translation between an open and a closed configuration, at least one receiver sidewall, and at least one first cup holder surface provided by a bottom surface of the door. The at least one first cup holder surface is configured to upwardly extend at least a portion of the receiver sidewall when the door is disposed in an open configuration. At least one second cup holder surface is provided by the at least one receiver sidewall. A retention system for a container is provided, including at least one container biasing member and at least one container supporting member.

In an embodiment, the at least one first cup holder surface includes the at least one container biasing member. The container biasing member may be a resilient pad that imposes a biasing force on a container held within the at least one receiver when the door is in an open configuration. In an alternate embodiment, the at least one second cup holder surface includes the at least one container biasing member. In this embodiment, the container biasing member is a resilient tab that imposes a biasing force on a container held within the at least one receiver.

In other aspects, vehicle consoles and vehicles including the described cup holder assembly are provided.

In the following description, there are shown and described embodiments of the disclosed cup holder assembly. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed cup holder assembly, and together with the description serve to explain certain principles thereof. In the drawing.

Reference will now be made in detail to embodiments of the disclosed cup holder assembly, examples of which are illustrated in the accompanying drawing figures.

DETAILED DESCRIPTION

Figure 2A:
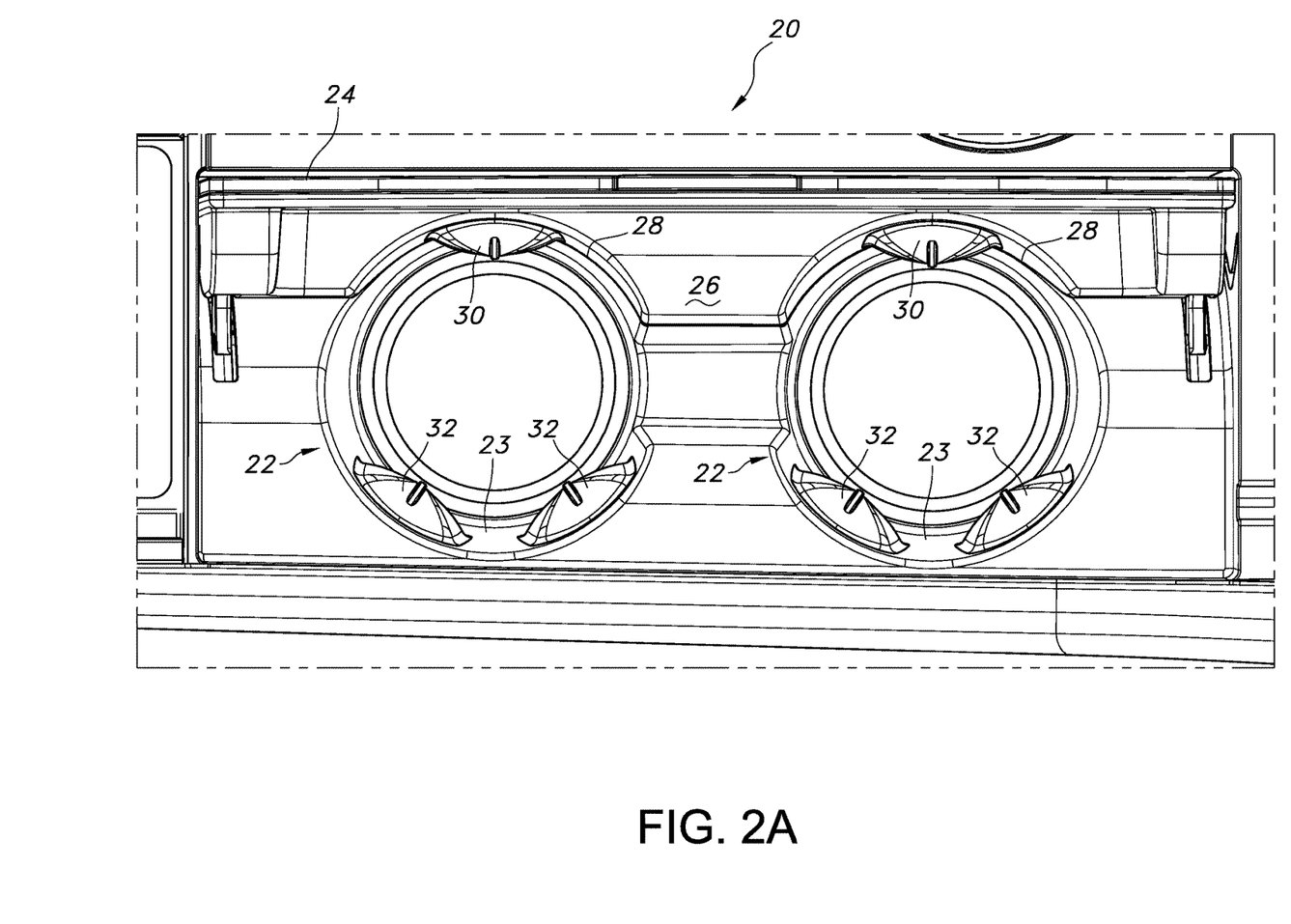
FIG. 2A shows a top plan view of an embodiment of a cup holder assembly according to the present disclosure.
Figure 2B:
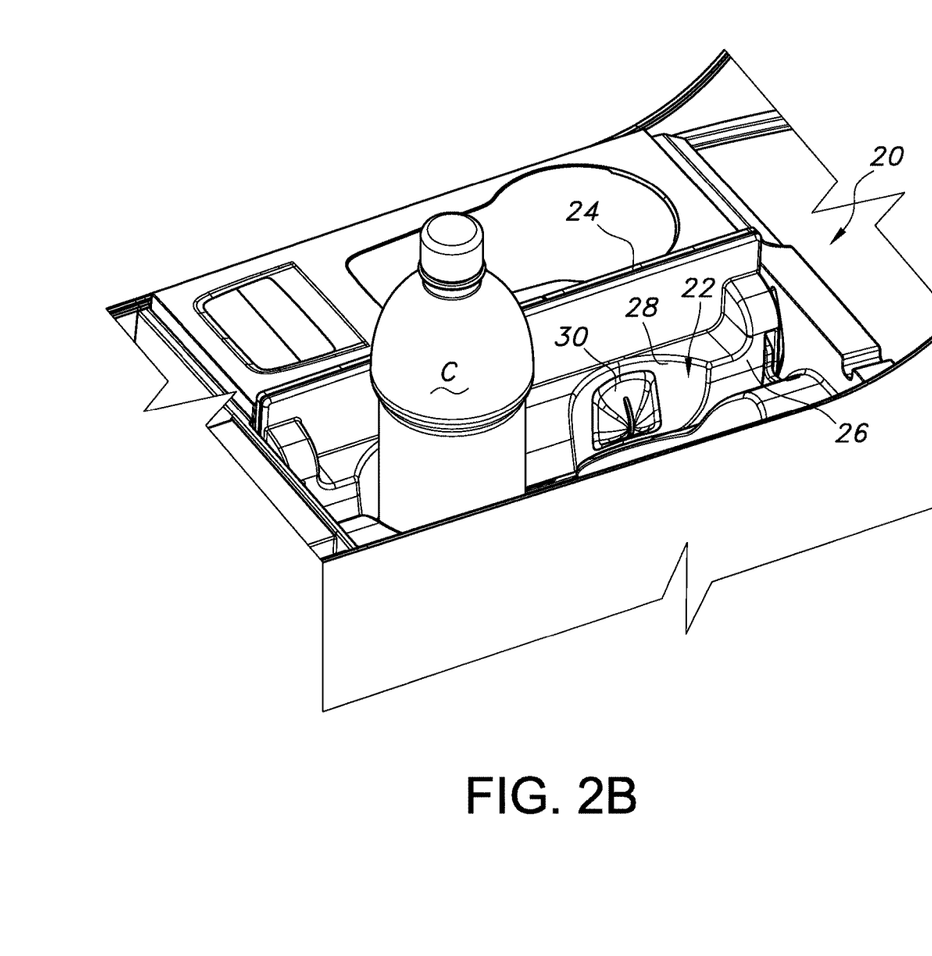
FIG. 2B shows a perspective view of the cup holder assembly of FIG. 2A.

With reference to FIGS. 2A and 2B, a cup holder assembly 20 is described including at least one container receiver surface 22 defined by at least one sidewall 23, and a door 24 configured for translation between an open and a closed configuration. A variety of closure mechanisms (not shown) for retaining door 24 in the closed configuration are known and contemplated for use herein, including without intending any limitation catches, snap fit closures, push-pull locks, hooks, etc. Also, a variety of mechanisms for biasing door 24 to an open configuration are known in the art and are contemplated for use herein, including without limitation spring-loaded mechanisms, dampers, and others. All such mechanisms are well known in the art and do not require detailed discussion herein.

Also, reference to a door 24 is merely intended to describe the function of the feature, i.e. to reversibly reveal or hide the interior of the cup holder assembly 20 including receivers 22. By referencing the structure as a "door," no inherent or explicit limitation is intended in terms of orientation, structure, manufacture, etc. of this feature of the cup holder assembly 20. As the skilled artisan will readily appreciate, the described cup holder 20 is equally adaptable for installation in a vehicle center console, a vehicle door, a vehicle dash panel, etc.

The door 24 includes a bottom surface 26 partially configured to upwardly extend a portion of receiver 22 when door 24 is in an open configuration. That is, as shown in FIG. 2A depicting substantially cylindrical receivers 22, a portion of door bottom surface 26 defines arcuate cup-holding surfaces 28, in the depicted embodiments having a similar curvature as a portion of each receiver 22. Thus, when in the open configuration, door bottom surface 26 defines a portion of a receiver C for a container C (see FIG. 2B).

The cup holder assembly 20 further includes a retention system defined by various biasing and supporting members, for holding a container C in place and preventing slippage, rattling, etc. In one embodiment shown in FIGS. 2A and 2B, the retention system is defined by a door-mounted biasing pad 30 disposed on the cup-holding surface 28 and by at least one receiver sidewall-mounted biasing pad 32, optionally having a lesser resiliency than the biasing pad 30. As will be appreciated, when a container C is placed in a receiver 22 (see FIG. 2B), biasing pad 30 imposes a biasing force on the container C, urging the container C against the supporting pads 32 to create a friction or interference fit. In this manner, slippage and rattling of the container C held within the receiver 22 is prevented or reduced. Alternatively, biasing pads 32 may be manufactured to have a greater resiliency than the biasing pad 30, thus forcing the container C against the biasing pad 30 to prevent or reduce slippage or rattling.

Figure 3A:
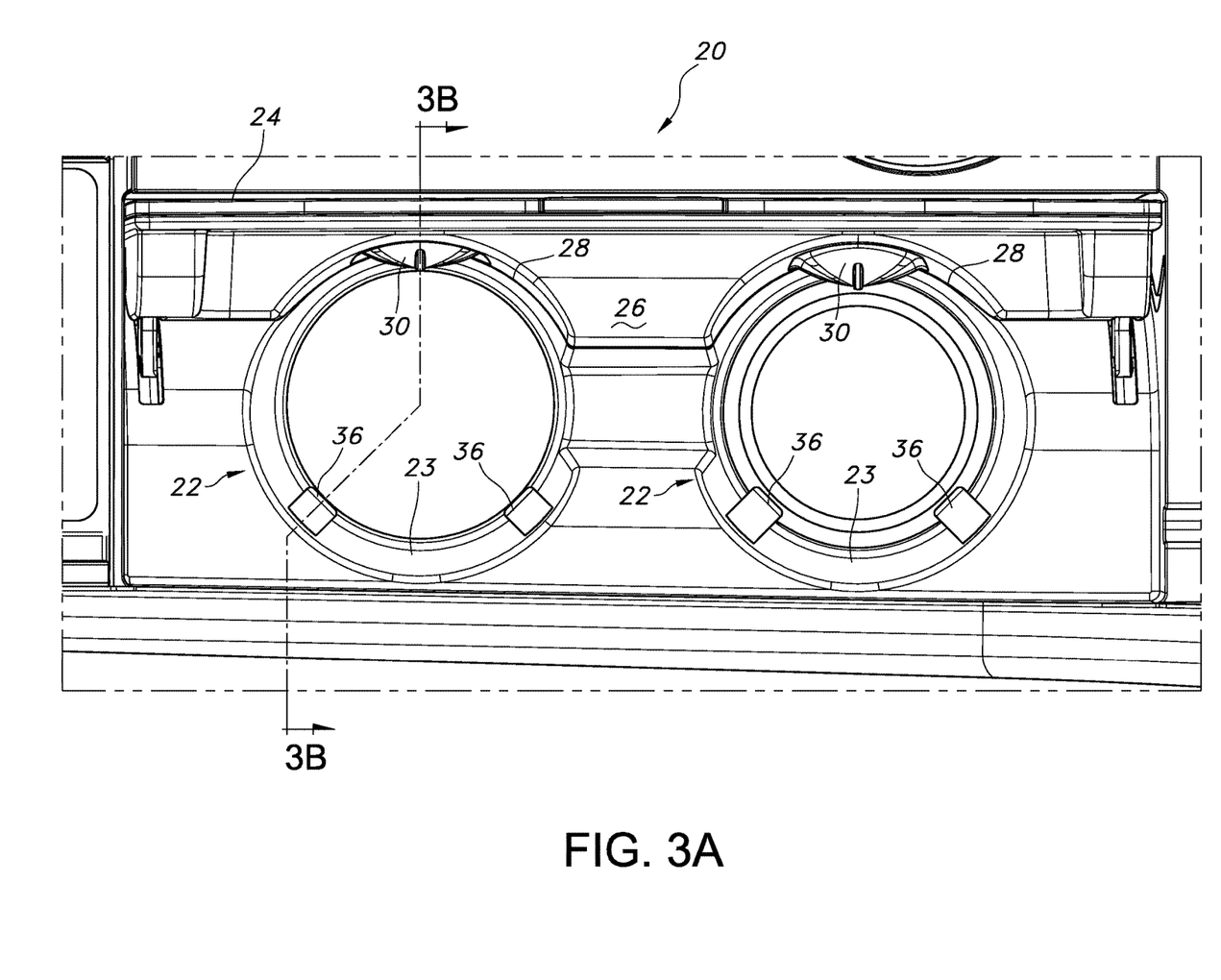
FIG. 3A shows a top plan view of an alternative embodiment of a cup holder assembly according to the present disclosure.
Figure 3B:
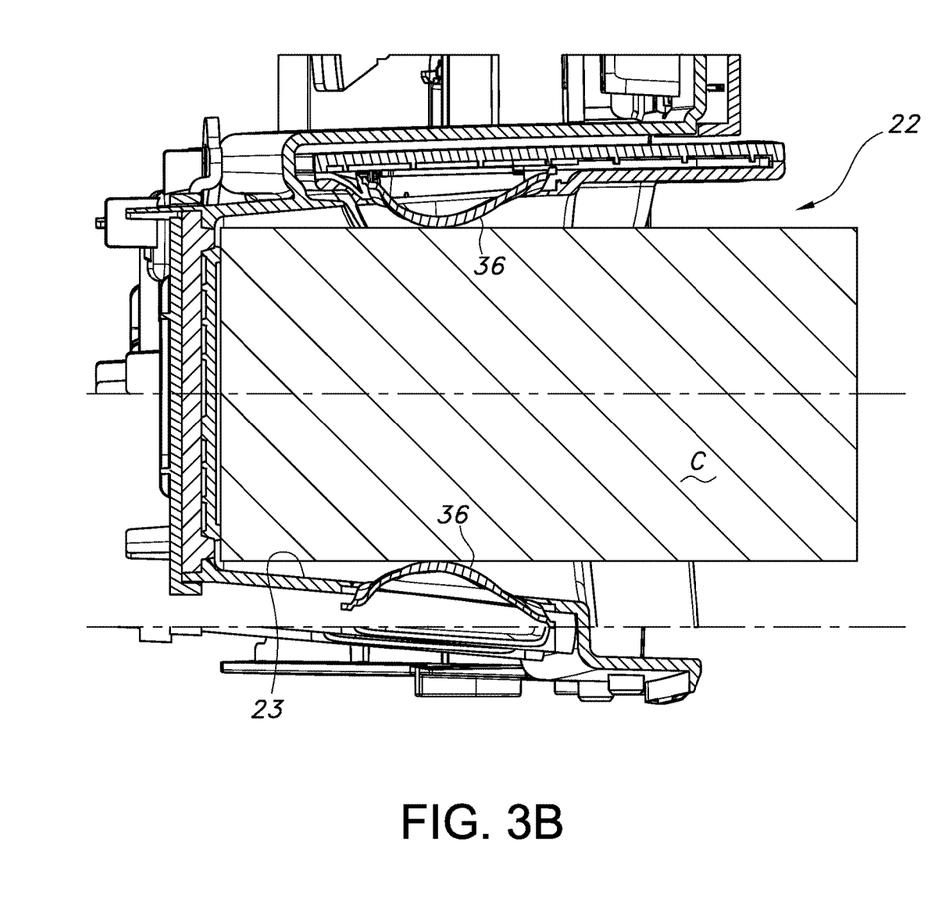
FIG. 3B shows a perspective view of the cup holder assembly of FIG. 3A.

In an alternative embodiment shown in FIGS. 3A and 3B, the retention system is defined by a door-mounted supporting pad 34 disposed on the cup-holding surface 28 and by at least one receiver sidewall-mounted biasing tab 36. By these structures, when a container C is placed in a receiver 22 (see FIG. 3B), biasing tabs 36 impose a biasing force on the container C, urging the container C against the door-mounted supporting pad 34 to create a friction or interference fit and prevent or reduce slippage and rattling of the container C held within the receiver 22. Any suitable structure for biasing tabs 36 is contemplated, including without limitation mechanical fingers of known design (FIG. 3B), spring-loaded tabs, and the like.

Figure 4:
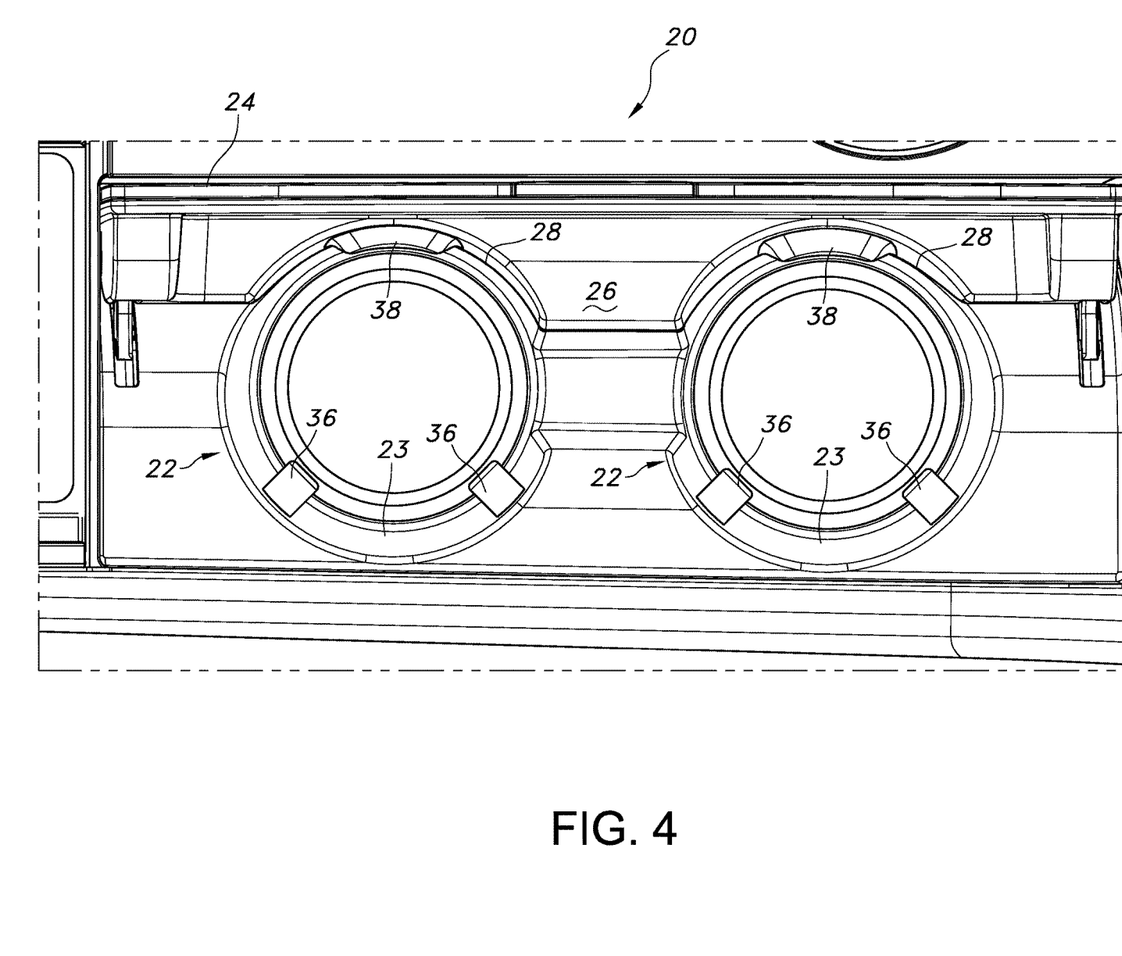
FIG. 4 shows a top plan view of another alternative embodiment of a cup holder assembly according to the present disclosure.

FIG. 4 shows another alternative embodiment of a retention system. As shown, the retention system is defined by a door-mounted resting pad 38 disposed on the cup-holding surface 28 and by at least one receiver sidewall-mounted biasing tab 36. Resting pad 38 is typically manufactured of a material having a lesser flexibility than, for example, biasing tabs 36. By these structures, when a container C is placed in a receiver 22 (see FIG. 3B), biasing tabs 36 impose a biasing force on the container C, urging the container C against the door-mounted resting pad 38 to create a friction or interference fit and prevent or reduce slippage and rattling of the container C held within the receiver 22. Again, any suitable structure for biasing tabs 36 is contemplated.

Figure 5:
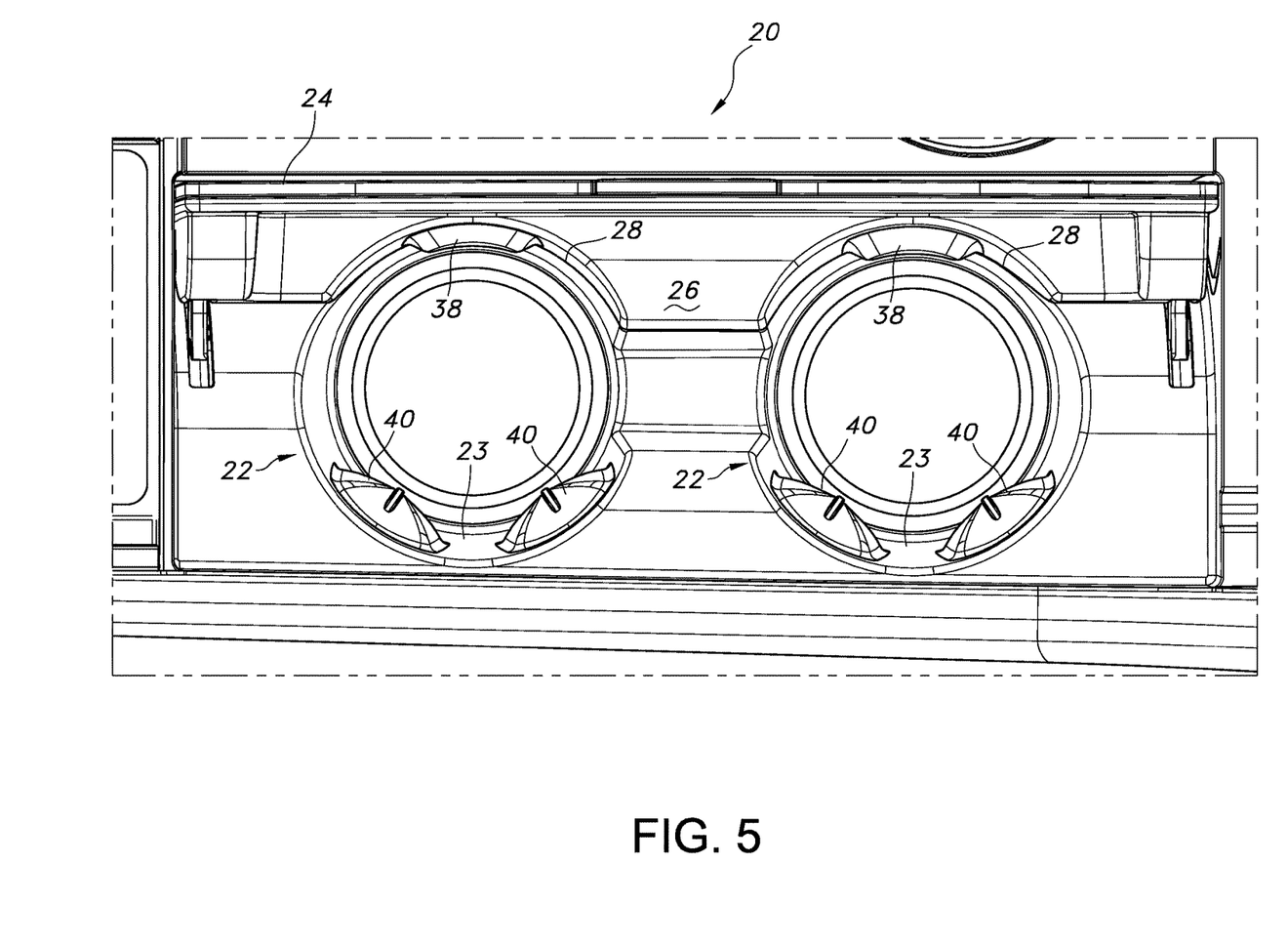
FIG. 5 shows a top plan view of yet another alternative embodiment of a cup holder assembly according to the present disclosure.

In yet another alternative embodiment (see FIG. 5), the retention system is defined by a door-mounted resting pad 38 disposed on the cup-holding surface 28 and by at least one receiver sidewall-mounted biasing pad 40. By these structures, when a container C is placed in a receiver 22 (see FIG. 3B), biasing pads 40 impose a biasing force on the container C, urging the container C against the door-mounted resting pad 38 to create a friction or interference fit and prevent or reduce slippage and rattling of the container C held within the receiver 22.

As will be appreciated, by the present disclosure a cup holder assembly 20 is provided which allows providing fewer retaining members to prevent container slippage than conventional designs, thus allowing a cup holder assembly of a reduced footprint. In turn, the described biasing member and/or supporting member and cup holder surface associated with a door of the cup holder assembly allows a lower-profile structure. By these features, a smaller cup holder assembly occupying less space in a vehicle console, door, etc. is made possible.

Obvious modifications and variations are possible in light of the above teachings. For example, the depicted embodiments of the cup holder assembly 20 show cylindrical receivers 22, but alternative geometries for the receivers are possible and contemplated. Likewise, the depicted embodiments of the cup holder assembly 20 show two receivers 22, but fewer or more receivers are of course possible and contemplated. The depicted embodiments show a cup holder assembly 20 configured for installation in a vehicle center console, but as described above alternative configurations are contemplated for installation in a vehicle door, dash panel, etc. All such modifications and variations are within the scope of the appended claims when interpreted in accordance with the breadth to which they are fairly, legally and equitably entitled.

What is claimed:

1. A cup holder assembly for a vehicle, comprising:
   a door configured for translation between an open and a closed configuration;
   at least one fixed receiver sidewall;
   at least one first cup holder surface provided by a bottom surface of the door, wherein the at least one first cup holder surface is configured to upwardly extend at least a portion of the at least one fixed receiver sidewall when the door is in the open configuration, and wherein the at least one first cup holder surface includes the at least one resilient container biasing member;
   at least one second cup holder surface provided by the at least one receiver sidewall; and
   a retention system comprising at least one resilient container biasing member and at least one resilient container supporting member.

2. The assembly of claim 1, wherein the at least one resilient container biasing member is a resilient pad that imposes a biasing force on a container held within the at least one receiver when the door is in an open configuration.

3. The assembly of claim 1, wherein the at least one resilient container biasing member is a resilient tab that imposes a biasing force on a container held within the at least one receiver.

4. A vehicle console including the assembly of claim 1.

5. A vehicle including the assembly of claim 1.

6. A cup holder assembly for a vehicle, comprising:
   a door configured for translation between an open and a closed configuration;
   at least one receiver defined by at least one fixed sidewall; and a container retention system comprising at least one door-mounted resilient container biasing member and at least one receiver sidewall-mounted resilient container supporting member.

7. The assembly of claim 6, wherein a bottom surface of the door is configured to upwardly extend at least a portion of the receiver sidewall when the door is in the open configuration.

8. The assembly of claim 6, wherein the at least one door-mounted resilient container biasing member is a resilient pad associated with the door bottom surface that imposes a biasing force on a container held within the at least one receiver when the door is in an open configuration.

9. A vehicle console including the assembly of claim 6.

10. A vehicle including the assembly of claim 6.

* * * * *